United States Patent
Xuan et al.

(10) Patent No.: US 8,253,714 B2
(45) Date of Patent: Aug. 28, 2012

(54) APPARATUS AND METHOD FOR OPERATING A SYMMETRIC CIPHER ENGINE IN CIPHER-BLOCK CHAINING MODE

(75) Inventors: Hawaii WY Xuan, Taipei (TW); Edward YS Lee, Taipei (TW); Robert David Parsons, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 12/271,006

(22) Filed: Nov. 14, 2008

(65) Prior Publication Data

US 2009/0141003 A1 Jun. 4, 2009

(30) Foreign Application Priority Data

Nov. 29, 2007 (TW) ............................ 96145467 A

(51) Int. Cl.
*G06F 3/042* (2006.01)
(52) U.S. Cl. ..................................... 345/175; 178/18.03
(58) Field of Classification Search .......... 345/172–178; 178/18.01–18.02, 18.05–18.08
See application file for complete search history.

(56) References Cited

U.S. PATENT DOCUMENTS

| | | | |
|---|---|---|---|
| 4,765,702 A | 8/1988 | Dohan et al. | |
| 6,974,719 B2 | 12/2005 | Kabs et al. | |
| 2005/0078095 A1* | 4/2005 | Ung et al. | 345/175 |
| 2006/0097989 A1* | 5/2006 | Ho | 345/173 |
| 2006/0114245 A1* | 6/2006 | Masters et al. | 345/175 |
| 2006/0139338 A1* | 6/2006 | Robrecht et al. | 345/175 |
| 2007/0165008 A1 | 7/2007 | Crockett | |

FOREIGN PATENT DOCUMENTS

| | | |
|---|---|---|
| CN | 2466703 Y | 12/2001 |
| CN | 2517021 Y | 10/2002 |
| TW | I220819 B | 9/2004 |
| TW | 200500922 A | 1/2005 |

\* cited by examiner

*Primary Examiner* — Hoa T Nguyen
*Assistant Examiner* — Andrew Sasinowski
(74) *Attorney, Agent, or Firm* — The Steadman Law Firm PLLC; Cynthia Seal

(57) ABSTRACT

An optical touch screen apparatus and method for manufacturing an optical touch screen apparatus are disclosed. The optical touch screen apparatus may comprise a touch screen plate having at least one pair of grooves formed on a front surface thereof; at least one pair of circuit boards disposed on the front surface of the touch screen plate, wherein each of the grooves respectively partially receives each of the circuit boards; an infrared emitting device for emitting an infrared beam, wherein the infrared emitting device is mounted on the first of the circuit boards; and an infrared receiving device for receiving the infrared beam, wherein the infrared receiving device is mounted on the second of the circuit boards and in optical communication with the infrared emitting device.

20 Claims, 5 Drawing Sheets

US 8,253,714 B2

APPARATUS AND METHOD FOR OPERATING A SYMMETRIC CIPHER ENGINE IN CIPHER-BLOCK CHAINING MODE

RELATED APPLICATION

This application claims priority under 35 U.S.C. §119 to Taiwanese Patent Application No. 96145467 filed Nov. 29, 2007, the entire text of which is specifically incorporated by reference herein.

FIELD OF THE INVENTION

The various embodiments described herein relate to an information display apparatus, and more particularly to a touch screen apparatus.

BACKGROUND OF THE INVENTION

Touch panels are usually used for input and output interfaces of information apparatuses, e.g., automatic teller machines (ATMs), cashers, and interactive multimedia stations. Touch panels may be categorized as pressure-sensitive touch panels, resistance type touch panels, surface sound wave type touch panels, capacitance touch panels, and infrared touch panels.

For optical touch panels such as infrared touch panels, a number of infrared emitting devices and a number of infrared receiving devices are mounted on the printed circuit board thereof. The shape of the printed circuit board is rectangular, and the inner area of the printed circuit board is removed. Along one pair of opposite strips of the printed circuit board, the infrared emitting devices and the infrared receiving devices are mounted and aligned to each other, and along the other pair of opposite strips of the printed circuit board, the infrared emitting devices and infrared receiving devices are mounted and aligned to each other. The aligned infrared emitting devices and infrared receiving devices define a matrix of intersecting light beams that coincide with the graphical icons and the computer-generated graphics at the infrared touch panel. When the intersecting beams are disrupted by an object (e.g., the finger of a user), the position at which the disruption occurs may be precisely calculated.

FIG. 1 shows a printed circuit board 100 of an infrared touch screen panel according to the prior art. The printed circuit board 100 may be a rectangular printed circuit board, wherein an inner area 104 is removed to provide a touch screen area. The infrared touch panel is constructed from a number of infrared emitting devices 108, 112 and a number of infrared receiving devices 116, 120 mounted on the printed circuit board 100. The infrared emitting devices 108 and the infrared receiving devices 116 are aligned to each other along one pair of opposite strips of the printed circuit board 100, and the infrared emitting devices 112 and the infrared receiving devices 120 are aligned to each other along the other pair of opposite strips of the printed circuit board 100. The aligned infrared emitting devices and infrared receiving devices 108, 116 and the aligned infrared emitting devices and infrared receiving devices 112, 120 define a matrix of intersecting light beams. The above components are further assembled with the frame (not shown in FIG. 1), the touch panel plate (not shown in FIG. 1), and the flat display panel (not shown in FIG. 1) to provide an infrared touch panel. In this conventional technology, the inner area 104 is to be removed from the printed circuit board 100. Thus, the material of the printed circuit board 100 is wasted considerably because of the removed inner area 104, and the manufacturing cost is relatively high.

SUMMARY OF THE INVENTION

The various embodiments described herein may provide an optical touch screen apparatus with a relatively lower manufacturing cost. Moreover, the various embodiments may provide an optical touch screen apparatus with a more precise assembly.

A first general aspect of the various embodiments provides an optical touch screen apparatus. The apparatus may comprise a touch screen plate and at least one pair of circuit boards disposed on a front surface of the touch screen plate. The apparatus further may comprise a light emitting device for emitting a light beam, the light emitting device being mounted on a first circuit board of a first pair of the at least one pair of circuit boards. The apparatus further may comprise a light receiving device for receiving the light beam, the light receiving device being mounted on a second circuit board of the first pair of the at least one pair of circuit boards and in optical communication with the light emitting device.

The apparatus may further comprise at least one pair of grooves formed on the front surface of the touch screen plate, wherein each groove of a first pair of the at least one pair of grooves respectively receives a portion of one circuit board of the first pair of the at least one pair of circuit boards for positioning the at least one pair of circuit boards on the touch screen plate. A portion of each circuit board of the first pair of the at least one pair of circuit boards may be respectively affixed to each groove of the first pair of the at least one pair of grooves by a glue material.

The touch screen plate may have a rectangular shape, and the at least one pair of circuit boards may be disposed near a pair of edges of the touch screen plate. The at least one pair of circuit boards may be a pair of circuit boards that defines a touch screen area, wherein each of the at least one pair of circuit boards may be of a "L" shape. The at least one pair of circuit boards may be two pairs of circuit boards that define a touch screen area, wherein each circuit board of the two pairs of circuit boards may be of a rectangular shape.

The apparatus further may comprise a control circuitry for receiving and controlling signals from the light emitting device and the light receiving device. The apparatus further may comprise a connection circuitry for electrically connecting the light emitting device, the light receiving device, and the control circuitry. The connection circuitry may be formed by an indium tin oxide (ITO) process. The ITO process may comprise forming an ITO layer on the touch screen plate and patterning the ITO layer to form the connection circuitry.

The touch screen plate may be formed of a transparent material. The transparent material may be selected from a group comprising a glass material and a plastic material.

The direction that the light receiving device receives the light beam from the light emitting device may be substantially parallel to the front surface of the touch screen plate. The at least one pair of circuit boards may be affixed to the front surface of the touch screen plate by a glue material.

A second general aspect of the various embodiments provides an information display apparatus for displaying content in accordance with information input thereto. The apparatus may comprise the above optical touch screen apparatus and a display panel disposed behind the optical touch screen apparatus.

A third general aspect of the various embodiments provides a method for manufacturing an optical touch screen apparatus. The method may comprise providing a touch screen plate. The method further may comprise providing at least one pair of circuit boards, wherein a light emitting device is mounted on a first circuit board of a first pair of the at least one pair of circuit boards for emitting a light beam, and wherein a light receiving device is mounted on a second circuit board of the first pair of the at least one pair of circuit boards for receiving the light beam. The method further may comprise disposing the at least one pair of circuit boards on a front surface of the touch screen plate, wherein the light receiving device is in optical communication with the light emitting device.

The foregoing and other features of the various embodiments will be apparent from the following detailed description.

BRIEF DESCRIPTION OF THE DRAWINGS

The various embodiments described herein will be described in detail, with reference to the following figures, wherein.

DETAILED DESCRIPTION

Figure 1:
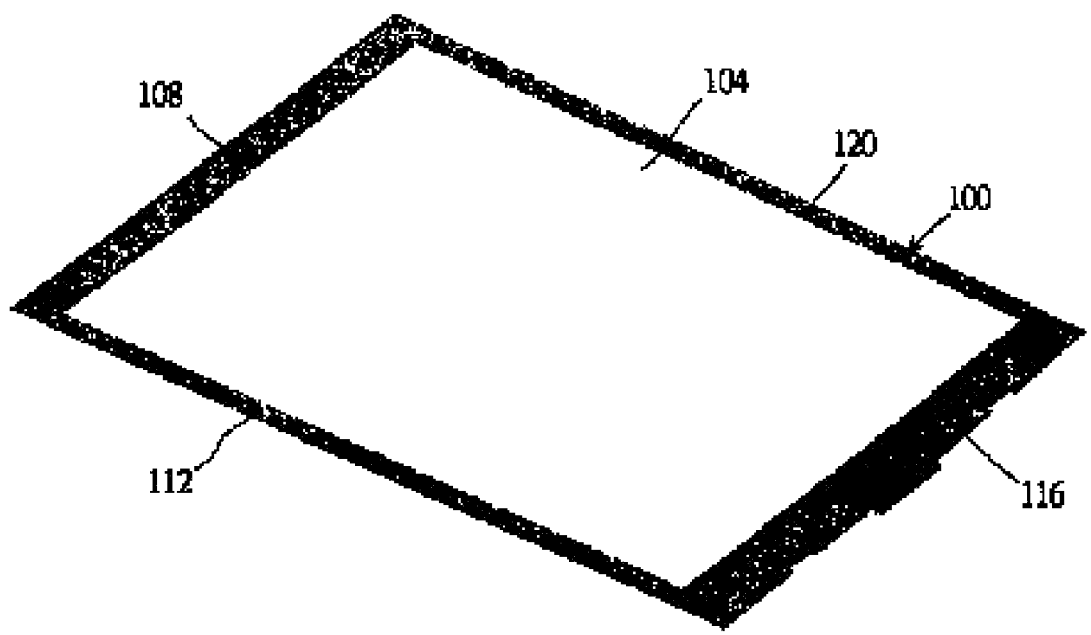
FIG. 1 illustrates a printed circuit board of a conventional infrared touch screen panel according to the prior art.
Figure 2:
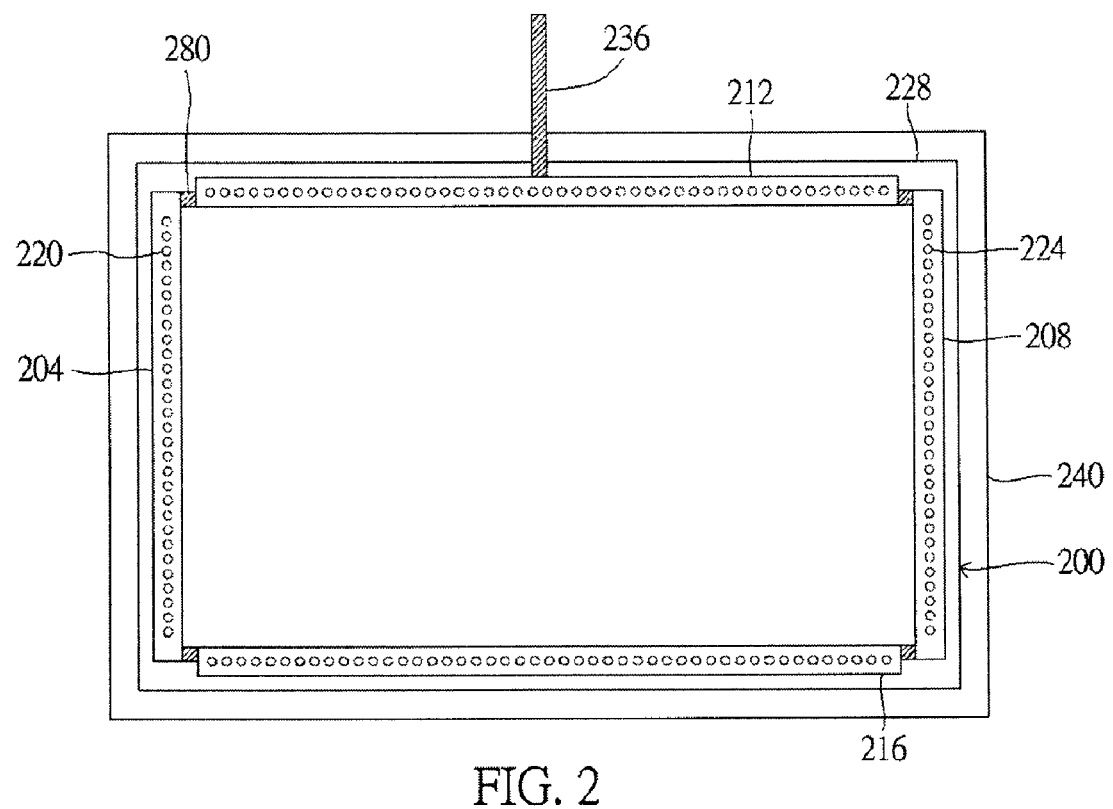
FIG. 2 illustrates a top view of an infrared touch panel according to an exemplary embodiment.

FIG. 2 illustrates a top view of an optical touch screen apparatus 200 (e.g., an infrared touch screen apparatus) and a frame 240 according to an exemplary embodiment. The infrared touch screen apparatus 200 may comprise a touch screen plate 228; one pair of circuit boards 204, 208; and one pair of circuit boards 212, 216. Each of the circuit boards 204, 208, 212, and 216 may be of a rectangular shape. The touch screen plate 228 may be of a rectangular shape. The pair of circuit boards 204, 208 may be disposed on a front surface 260 (see FIG. 3) of the touch screen plate 228, along one pair of opposite edges of the touch screen plate 228. The pair of circuit boards 212, 216 may be disposed on the front surface 260 of the touch screen plate 228, along the other pair of opposite edges of the touch screen plate 228.

Figure 3:
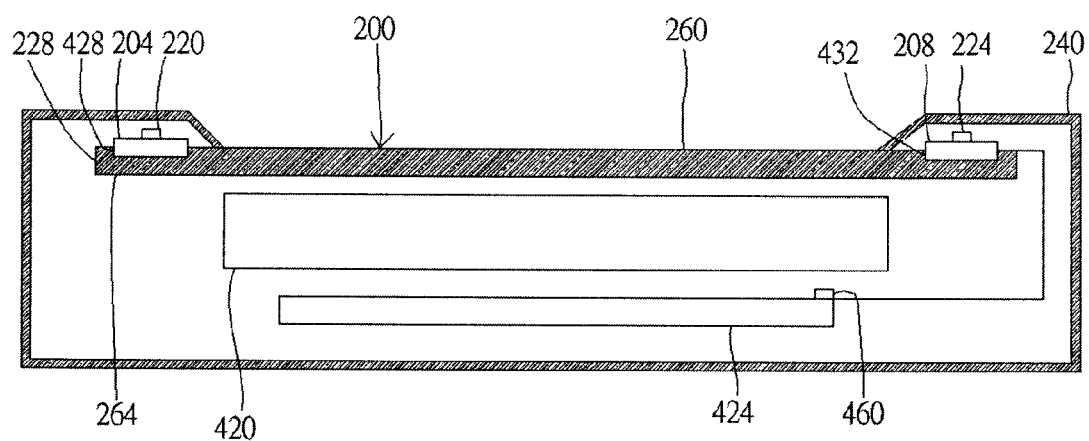
FIG. 3 illustrates a cross-sectional view of an infrared touch panel according to an exemplary embodiment.

FIG. 3 illustrates a cross-sectional view of the infrared touch screen apparatus 200 and the frame 240 according to an exemplary embodiment. One pair of grooves 428, 432 may be formed on the front surface 260 of the touch screen plate 228, along one pair of opposite edges of the touch screen plate 228, for respectively receiving a portion of the circuit boards 204, 208. Another pair of grooves (not shown in FIG. 3) may be formed on the front surface 260 of the touch screen plate 228, along the other pair of opposite edges of the touch screen plate 228, for respectively receiving a portion of the circuit boards 212, 216. The circuit boards 204, 208 may be affixed to the grooves 428, 432 by use of a glue material. The circuit boards 212, 216 may be affixed to the grooves (not shown in FIG. 3) by use of a glue material. Alternatively, the step of forming grooves may be omitted, in which case the circuit boards 204, 208, 212, 216 may be directly affixed to the front surface 260 of the touch screen plate 228 by direct use of a glue material. The touch screen plate 228 may be made of a transparent material, such as a glass material or a plastic material. Through the above arrangement, the circuit boards 204, 208, 212, and 216 may be firmly positioned on the front surface 260 of the touch screen plate 228. Moreover, there is no need to remove a central area of the touch screen plate 228, so the manufacturing cost thereof is relatively low.

The infrared touch screen apparatus 200 also may comprise a plurality of light emitting devices, such as infrared emitting devices 220, and a plurality of light receiving devices, such as infrared receiving devices 224. The infrared emitting devices 220 may be disposed on the circuit board 204 for respectively emitting a beam (e.g., an infrared beam). The infrared receiving devices 224 may be disposed on the circuit board 208 for receiving the beam and may be in optical communication with the infrared emitting devices 220. The light-emitting direction of the infrared emitting devices 220 may be substantially parallel to the front surface 260 of the touch screen plate 228. The light-receiving direction of the infrared receiving devices 224 may be substantially parallel to the front surface 260 of the touch screen plate 228. Similarly, the infrared touch screen apparatus 200 also may comprise a plurality of infrared emitting devices disposed on the circuit board 212 (not shown in FIG. 3) and a plurality of infrared receiving devices disposed on the circuit board 216 (not shown in FIG. 3). The infrared emitting devices and the infrared receiving devices may form an infrared matrix in a conventional way known in the art, and thus the functionality of an infrared touch panel may be achieved. Since grooves may be formed on the front surface 260 of the touch screen plate 228 in order to affix the circuit boards 204, 208, 212, and 216 as previously discussed, the assembly of all of the infrared receiving devices and all of the infrared emitting devices is relatively precise compared to the prior art.

The infrared touch screen apparatus 200 further may comprise a control circuitry 460. The control circuitry 460 may be disposed on an integrated circuit chip implemented in a conventional way known in the art for receiving and controlling the signals from the infrared emitting devices and the infrared receiving devices. A circuit board 424 may be disposed under a rear surface 264 of the touch screen plate 228 for carrying the integrated circuit chip having the control circuitry 460.

The infrared touch screen apparatus 200, the circuit board 424, and a flat display panel 420 (e.g., a LCD panel) may be assembled in the frame 240. The flat display panel 420 may be disposed under the rear surface 264 of the touch screen plate 228.

Referring again to FIG. 2, the infrared touch screen apparatus 200 further may comprise a connection circuitry 280. The connection circuitry 280 may connect the infrared emitting devices, the infrared receiving devices, and the control circuitry 460. The connection circuitry 280 may be manufactured in a conventional way known in the art. For example, an indium tin oxide (ITO) process may be used. The ITO process may comprise forming an ITO layer on the touch screen plate 228 and patterning the ITO layer to form the connection circuitry.

The infrared touch screen apparatus 200 further may comprise an input/output circuitry 236. The input/output circuitry 236, implemented in a conventional way known in the art, may be connected to an outside system in order to permit such outside system to control the input/output signals pertaining to the infrared touch screen apparatus 200.

Figure 4:
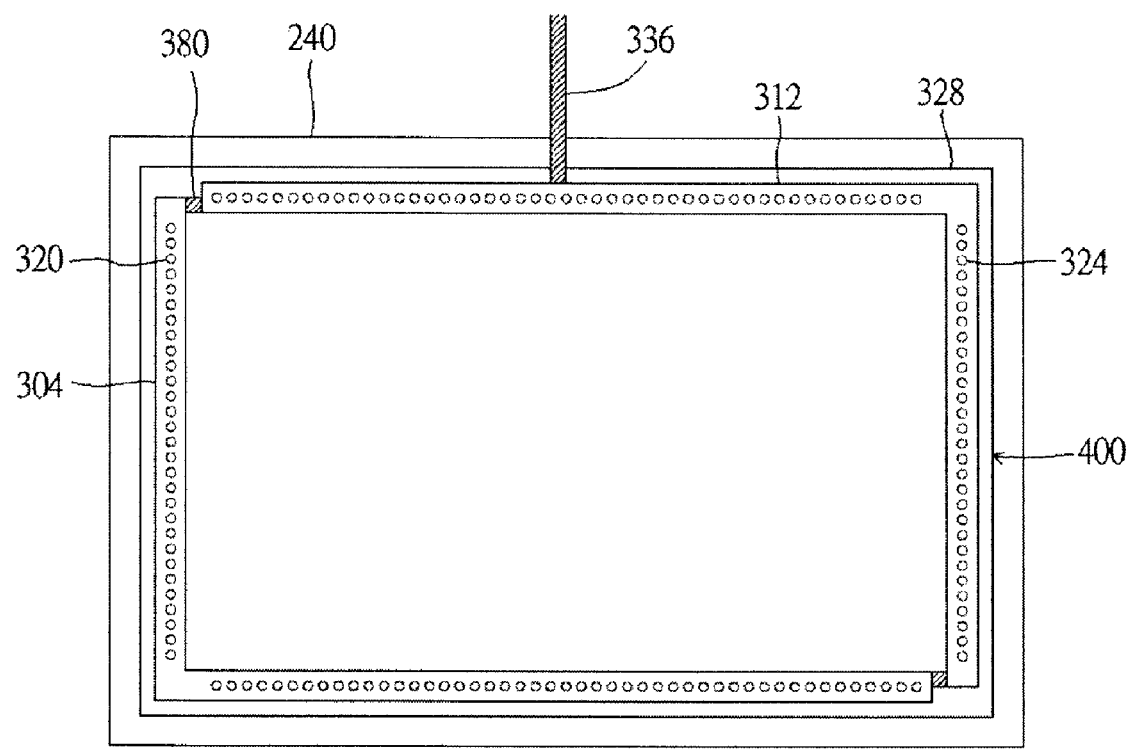
FIG. 4 illustrates an infrared touch panel according to another exemplary embodiment.

FIG. 4 illustrates a top view of an optical touch screen apparatus 400 (e.g., an infrared touch screen apparatus) and the frame 240 according to another exemplary embodiment. The infrared touch screen apparatus 400 may comprise a touch screen plate 328 and one pair of circuit boards 304, 312.

The touch screen plate 328 may be of a rectangular shape. The pair of circuit boards 304, 312 may be of a "L" shape and may be disposed on a front surface of the touch screen plate 328. There may be one pair of "L"-shaped grooves (not shown in FIG. 4) formed on the front surface of the touch screen plate 328 for receiving a portion of the circuit boards 304, 312. The circuit boards 304, 312 may be affixed to the "L"-shaped grooves by use of a glue material. Alternatively, the step of forming "L"-shaped grooves may be omitted, in which case the circuit boards 304, 312 may be directly affixed to the front surface of the touch screen plate 328 by direct use of a glue material. The touch screen plate 328 may be made of a transparent material, such as a glass material or a plastic material. Through the above arrangement, the circuit boards 304, 312 may be firmly positioned on the front surface of the touch screen plate 328.

In this exemplary embodiment, a plurality of infrared emitting devices 320 may be disposed on the circuit board 304 for respectively emitting an infrared beam. A plurality of infrared receiving devices 324 may be disposed on the circuit board 312 for respectively receiving the infrared beam and may be respectively in optical communication with the infrared emitting devices 320. The infrared emitting devices 320 and the infrared receiving devices 324 may form an infrared matrix in a conventional way known in the art, and thus the functionality of an infrared touch panel may be achieved. The light-emitting direction of the infrared emitting devices 320 may be substantially parallel to the front surface of the touch screen plate 328. The light-receiving direction of the infrared receiving devices 324 may be substantially parallel to the front surface of the touch screen plate 328.

The infrared touch screen apparatus 400 further may comprise a control circuitry (not shown in FIG. 4). The control circuitry may be disposed on an integrated circuit chip implemented in a conventional way known in the art for receiving and controlling the signals from the infrared emitting devices 304 and the infrared receiving devices 320. A circuit board may be disposed under a rear surface of the touch screen plate 328 for carrying the integrated circuit chip.

The infrared touch screen apparatus 400 further may comprise a connection circuitry 380. The connection circuitry 380 may connect the infrared emitting devices 320, the infrared receiving devices 324, and the control circuitry. The connection circuitry 380 may be manufactured in a conventional way known in the art. For example, an indium tin oxide (ITO) process may be used. The ITO process may comprise forming an ITO layer on the touch screen plate 328 and patterning the ITO layer to form the connection circuitry.

FIG. 4 also provides an input/output circuitry 336. The input/output circuitry 336, implemented in a conventional way known in the art, may be connected to an outside system for allowing the outside system to control the input/output signals pertaining to the infrared touch screen apparatus 400

Figure 5:
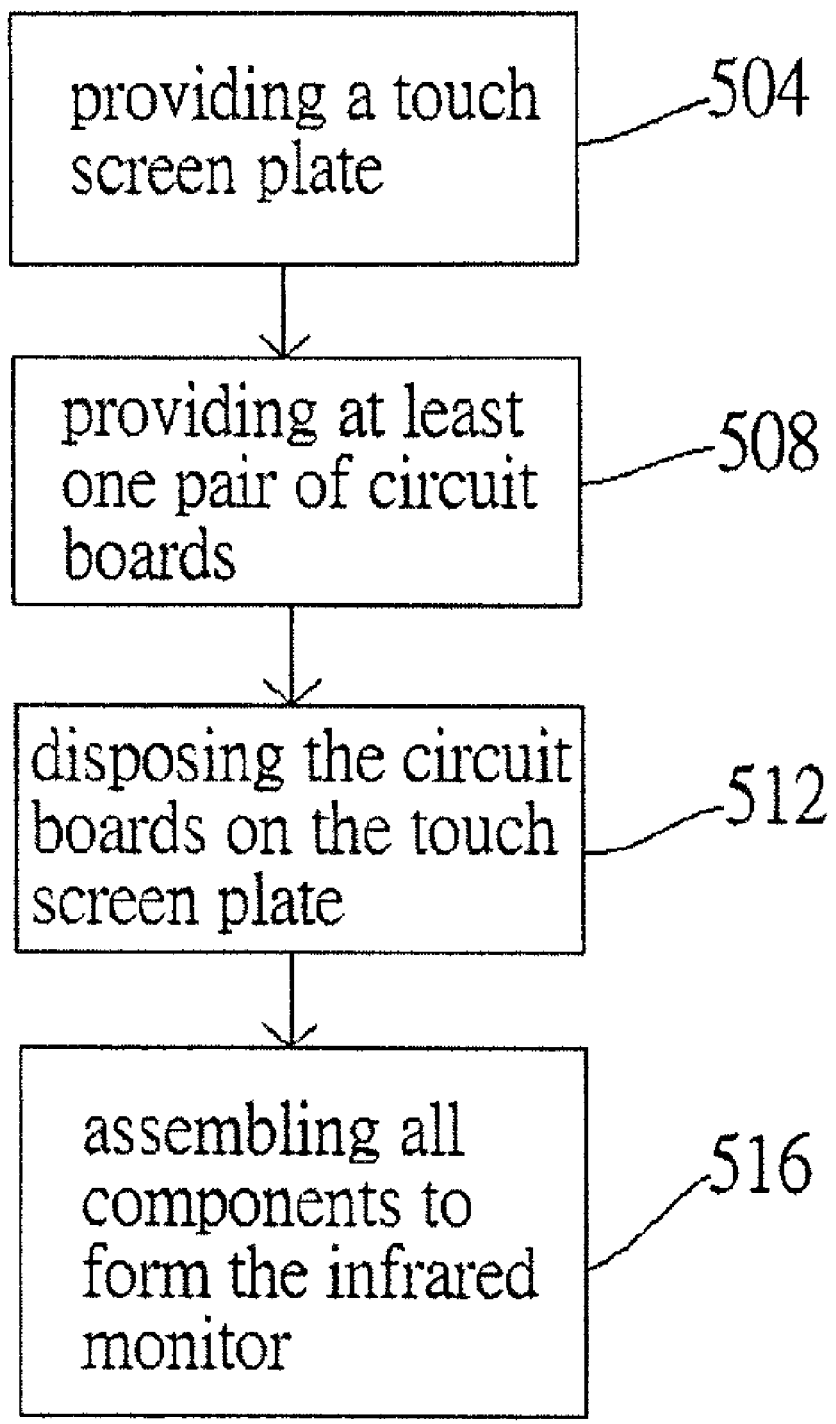
FIG. 5 provides a flow chart illustrating a process for manufacturing an infrared display apparatus according to an exemplary embodiment.

FIG. 5 provides a process for manufacturing an infrared display apparatus (e.g., infrared display panel) according to an exemplary embodiment. The process comprises the following:

(1) Providing a touch screen plate (step 504). As previously described, at least one pair of grooves may be formed on a front surface of the touch screen plate. A connection circuitry may also be formed on the front surface of the touch screen plate. The connection circuitry may electrically connect infrared emitting devices, infrared receiving devices, and control circuitry.

(2) Providing at least one pair of circuit boards (step 508). As previously described, a plurality of infrared emitting devices may be mounted on one of the at least one pair of circuit boards for respectively emitting an infrared beam. A plurality of infrared receiving devices may be mounted on the other of the at least one pair of circuit boards for receiving the infrared beam.

(3) Disposing the at least one pair of circuit boards on the front surface of the touch screen plate (step 512). As previously described, in later steps, the infrared receiving devices may be in optical communication with the infrared emitting devices. Each of the aforementioned grooves on the front surface of the touch screen plate may be used to respectively receive a portion of one of the at least one pair of circuit boards so that the circuit boards may be respectively positioned on the touch screen plate. A glue material may be used to firmly affix a portion of each circuit board in each groove. Alternatively, the circuit boards may be directly affixed to the front surface of the touch screen plate by a glue material, without forming grooves. The number of the circuit boards may be two, and each circuit board may be a flat board of a "L" shape. The number of the circuit boards may be four, and each circuit board may be a flat board of a rectangular shape. The circuit boards thus may define a rectangular touch screen area on the touch screen plate. Since grooves may be formed on the front surface of the touch screen plate in order to affix the circuit boards as previously described, the assembly of the infrared receiving devices and the infrared emitting devices may be more precise compared to the prior art.

(4) Assembling all components to form the infrared monitor (step 516). More particularly, a frame, the circuit boards, a flat display panel, inside circuits, outside circuits, and an infrared touch screen apparatus according to an exemplary embodiment may be assembled to manufacture the information display apparatus (e.g., an infrared monitor).

While various exemplary embodiments have been described above, it is evident that many alternatives, modifications and variations will be apparent to those skilled in the art. Accordingly, the various embodiments set forth above are intended to be illustrative, not limiting. Various changes may be made without departing from the spirit and scope of the disclosure as defined in the following claims.

The invention claimed is:

1. An optical touch screen apparatus comprising:
   a touch screen plate;
   at least one pair of circuit boards disposed on a front surface of said touch screen plate;
   a light emitting device for emitting a light beam, said light emitting device being mounted on a first circuit board of a first pair of said at least one pair of circuit boards;
   a light receiving device for receiving said light beam, said light receiving device being mounted on a second circuit board of said first pair of said at least one pair of circuit boards and in optical communication with said light emitting device; and
   at least one pair of grooves formed on said front surface of said touch screen plate, wherein each groove of a first pair of said at least one pair of grooves respectively receives a portion of one circuit board of said first pair of said at least one pair of circuit boards for positioning said at least one pair of circuit boards on said touch screen plate.

2. The optical touch screen apparatus according to claim 1, wherein said portion of each circuit board of said first pair of said at least one pair of circuit boards is respectively affixed to each groove of said first pair of said at least one pair of grooves by a glue material.

3. The optical touch screen apparatus according to claim 1, wherein said touch screen plate has a rectangular shape, and wherein said at least one pair of circuit boards is disposed near a pair of edges of said touch screen plate.

4. The optical touch screen apparatus according to claim 1, wherein said at least one pair of circuit boards comprises a pair of circuit boards that defines a touch screen area, and wherein each of said one pair of circuit boards has a "L" shape.

5. The optical touch screen apparatus according to claim 1, wherein said at least one pair of circuit boards comprises two pairs of circuit boards that define a touch screen area, and wherein each circuit board of said two pairs of circuit boards has a rectangular shape.

6. The optical touch screen apparatus according to claim 1, further comprising a control circuitry for receiving and controlling signals from said light emitting device and said light receiving device.

7. The optical touch screen apparatus according to claim 6, further comprising a connection circuitry for electrically connecting said light emitting device, said light receiving device, and said control circuitry.

8. The optical touch screen apparatus according to claim 7, wherein said connection circuitry is formed by an indium tin oxide (ITO) process, wherein said ITO process comprises:
    forming an ITO layer on said touch screen plate; and
    patterning said ITO layer to form said connection circuitry.

9. The optical touch screen apparatus according to claim 1, wherein said touch screen plate is formed of a transparent material.

10. The optical touch screen apparatus according to claim 9, wherein said transparent material is selected from a group comprising a glass material and a plastic material.

11. The optical touch screen apparatus according to claim 1, wherein a direction of said light receiving device receiving said light beam from said light emitting device is substantially parallel to said front surface of said touch screen plate.

12. The optical touch screen apparatus according to claim 1, wherein said at least one pair of circuit boards is affixed to said front surface of said touch screen plate by a glue material.

13. An information display apparatus for displaying content in accordance with information input thereto, said information display apparatus comprising:
    an optical touch screen apparatus, wherein said optical touch screen apparatus comprises:
        a touch screen plate;
        at least one pair of circuit boards disposed on a front surface of said touch screen plate;
        a light emitting device for emitting a light beam, said light emitting device being mounted on a first circuit board of a first pair of said at least one pair of circuit boards;
        a light receiving device for receiving said light beam, said light receiving device being mounted on a second circuit board of said first pair of said at least one pair of circuit boards and in optical communication with said light emitting device; and
        at least one pair of grooves formed on said front surface of said touch screen plate, wherein each groove of a first pair of said at least one pair of grooves respectively receives a portion of one circuit board of said first pair of said at least one pair of circuit boards for positioning said at least one pair of circuit boards on said touch screen plate;
    and
    a display panel disposed behind said optical touch screen apparatus.

14. The information display apparatus according to claim 13, wherein said at least one pair of circuit boards comprises a pair of circuit boards that defines a touch screen area, and wherein each of said one pair of circuit boards has a "L" shape.

15. The information display apparatus according to claim 13, wherein said at least one pair of circuit boards comprises two pairs of circuit boards that define a touch screen area, and wherein each circuit board of said two pairs of circuit boards has a rectangular shape.

16. A method for manufacturing an optical touch screen apparatus, said method comprising:
    providing a touch screen plate;
    providing at least one pair of circuit boards, wherein a light emitting device is mounted on a first circuit board of a first pair of said at least one pair of circuit boards for emitting a light beam, and wherein a light receiving device is mounted on a second circuit board of said first pair of said at least one pair of circuit boards for receiving said light beam;
    forming at least one pair of grooves on a front surface of said touch screen plate, wherein each groove of a first pair of said at least one pair of grooves respectively receives a portion of one circuit board of said first pair of said at least one pair of circuit boards for positioning said at least one pair of circuit boards on said touch screen plate; and
    disposing said at least one pair of circuit boards on said front surface of said touch screen plate, wherein said light receiving device is in optical communication with said light emitting device.

17. The method according to claim 16, wherein said touch screen plate has a rectangular shape, and wherein said at least one pair of circuit boards is disposed near a pair of edges of said touch screen plate.

18. The method according to claim 16, wherein said at least one pair of circuit boards comprises a pair of circuit boards that defines a touch screen area, and wherein each of said one pair of circuit boards has a "L" shape.

19. The method according to claim 16, wherein said at least one pair of circuit boards comprises two pairs of circuit boards that define a touch screen area, and wherein each circuit board of said two pairs of circuit boards has a rectangular shape.

20. The method according to claim 16, further comprising providing a control circuitry for receiving and controlling signals from said light emitting device and said light receiving device.

* * * * *

UNITED STATES PATENT AND TRADEMARK OFFICE
CERTIFICATE OF CORRECTION

PATENT NO. : 8,253,714 B2  Page 1 of 1
APPLICATION NO. : 12/271006
DATED : August 28, 2012
INVENTOR(S) : Xuan et al.

It is certified that error appears in the above-identified patent and that said Letters Patent is hereby corrected as shown below:

Title Page, after the title Item (54) and Column 1, line 1, delete the provided title in its entirety, and insert the following new title:

-- OPTICAL TOUCH SCREEN APPARATUS --

Signed and Sealed this
Twenty-seventh Day of November, 2012

David J. Kappos
*Director of the United States Patent and Trademark Office*